Nov. 29, 1927.  
B. A. LINDERMAN  
FLUID PRESSURE DEVICE  
Filed June 22, 1925  
1,651,212  
2 Sheets-Sheet 1
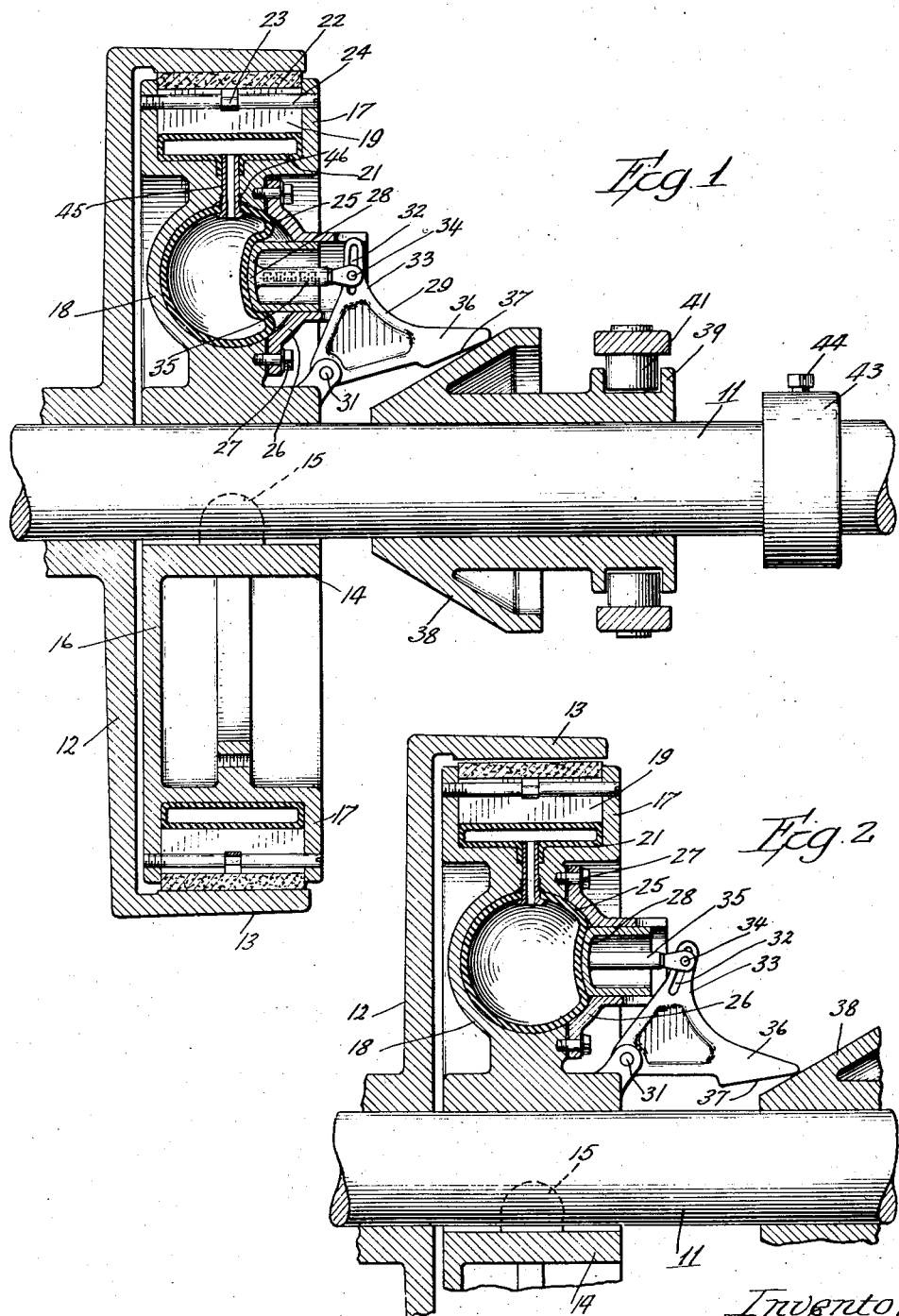

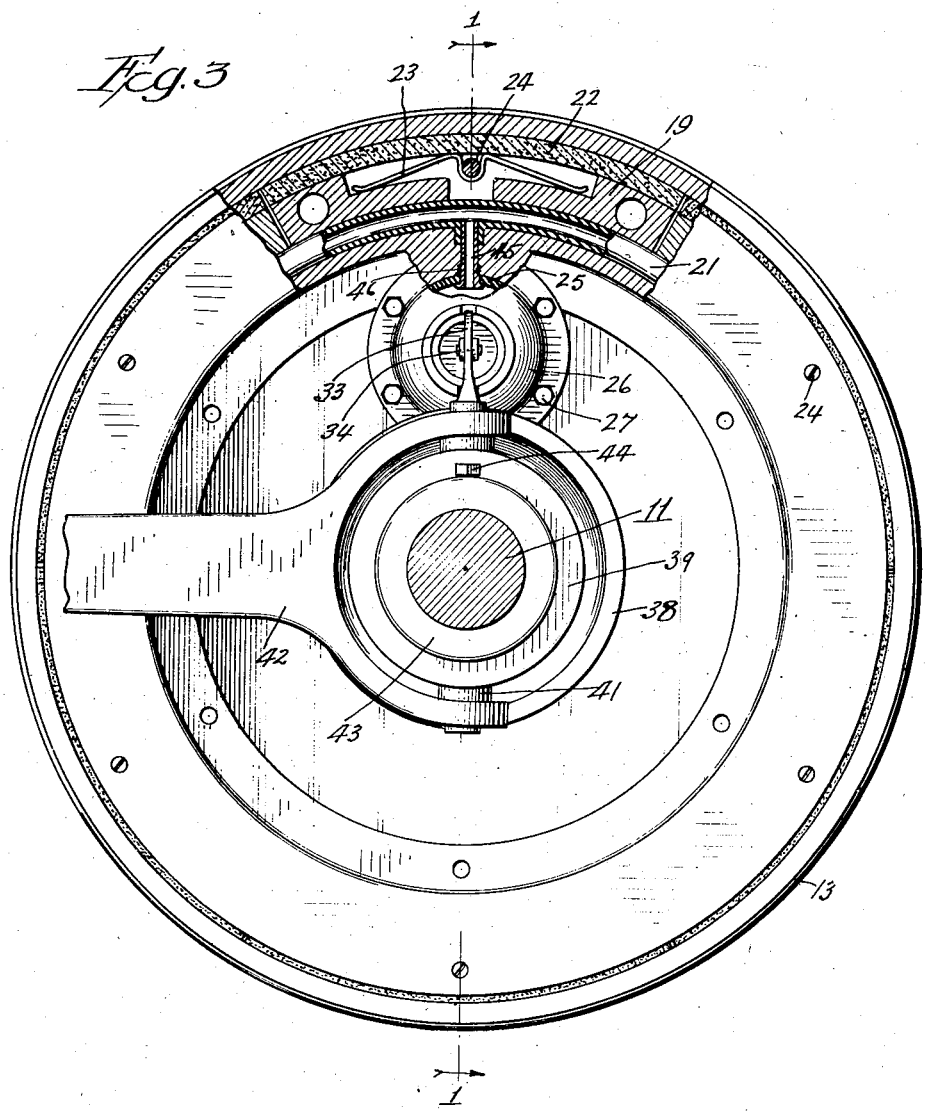

Patented Nov. 29, 1927.

1,651,212

UNITED STATES PATENT OFFICE.

BERT A. LINDERMAN, OF NEW YORK, N. Y., ASSIGNOR TO LINDERMAN & CO., OF WILMINGTON, DELAWARE, A CORPORATION OF DELAWARE.

FLUID-PRESSURE DEVICE.

Application filed June 22, 1925. Serial No. 38,703.

My invention relates to fluid pressure devices and more particularly to the utilization of such devices in connection with automobiles and other automotive vehicles.

An important object of the invention is the provision of an improvement in fluid pressure devices adapted to facilitate the control of the pressure medium and to simplify the mechanism required for operation of the devices.

Another object of my invention resides in providing a construction for fluid pressure operated devices including two members which are adapted either to rotate relatively or to remain relatively at rest and which members are controlled by shiftable segments shifted by an inflatable member, wherein the means for shifting the inflatable member is mounted directly adjacent the inflatable member and on that one of the first mentioned two members which carries the inflatable member, the inflatable member and the means for inflating it being constructed and arranged to form a hermetically sealed closed fluid containing system.

Numerous other objects and advantages of the invention will be apparent as it is better understood from the following description, which, taken in connection with the accompanying drawings, discloses a preferred embodiment thereof.

Referring to the drawings,

Figure 1 is a sectional view of a clutch in which my invention is embodied, being taken longitudinally of a driving shaft and substantially upon the section line 1—1 in Fig. 3;

Fig. 2 is a detail sectional view, showing a different position of the parts; and Fig. 3 is a face elevation, partially broken away and shown in section and taken from the right, viewing Figs. 1 and 2.

On said drawings, illustrating the best manner in which I have thus far contemplated applying the principles of my invention, the reference character 11 indicates a shaft adapted to be driven from any suitable source of power and having loosely mounted thereon a drum 12, having a friction wall 13, a driving element 14 being fixed to said shaft 11, as indicated at 15. Said driving element comprises a support 16, formed or provided with a channel 17 around the periphery thereof and, in the preferred embodiment shown on the drawings, with a housing 18 for a purpose which will hereinafter appear.

A plurality of radially movable segments 19, of wood or like heat-insulating material, are disposed within the channel 17 above an inflatable tube 21, which is adapted to be inflated by a suitable fluid pressure medium to extend said segments into driving engagement with the wall or flange 13 of the member 12. Suitable lining 22, of asbestos or like material, is provided on the exterior of said segments and springs 23, mounted upon pins 24 fixed in the walls of the channel 17, are employed to hold said segments normally in retracted position. A diaphragm, which, in the present instance, is in the form of a collapsible hollow member of flexible material preferably in the form of a ball 25, is disposed in the housing 18, which latter is closed by means of an arcuate face plate 26 secured thereto by screws 27. A plunger 28 is provided for collapsing the ball or actuators 25 and is adapted to be operated by means of a member 29 pivoted at 31 to the fixed element 14 and having a slot 32 formed in an extension 33 thereof to receive a pin 34 in a shank 35 extending rearwardly from the plunger 28. Said member 29 is of bell crank formation and the opposite arm 36 thereof is provided with an inclined surface 37 adapted to be engaged by a slidable cone 38, having at the rear thereof a grooved collar 39 in which studs 41, extending inwardly from a bifurcated operating lever 42, are disposed. A collar 43 is secured to the shaft 11 by means of a screw 44 to limit the stroke of said cone 38, and it will be evident that movement of said cone toward the left, viewing Figs. 1 and 2, will collapse the ball diaphragm 25, as shown in Fig. 1, and thereby expel the pressure medium therefrom into the tube 21 to inflate the same and extend the segments 19. When said cone is moved in the opposite direction, the member 36 assumes the position shown in Fig. 2 and a sufficient amount of the pressure medium is withdrawn from said tube 21 into the ball 25 to permit retraction of said segments, moving the same out of engagement with the drum 12, as shown in said Fig. 2. A conduit 45 connects the ball diaphragm 25 with the tube 21 and is threaded into the support 16 at 46.

Another important advantage of the present arrangement resides in the compact arrangement afforded by constructing the inner member 14 with the hollowed-out walls 18, which form the rigid enclosing casing for the compressible member 25. By this disposition, these rigid walls not only form an enclosing casing but also provide a rigid backing for the hollow ball-like member 25, so that when the plunger 28 advances inwardly it necessarily causes a transmission of the fluid pressure medium from the hollow member 25.

It will be noted that applicant provides a hermetically sealed fluid containing system which includes the rubber-like inflatable tube 21 the short connector 45 and the ball-like rubber actuator 25. By mounting all of these elements on the member 16 and by locating them directly adjacent the shiftable members 19, applicant provides the most beneficial construction since only a slight movement of the plunger 28 is necessary to inflate the tube 21. In other words the mounting of this fluid containing hermetically sealed system at the point shown and described is extremely advantageous and is new.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. A fluid pressure device, comprising a shaft, first and second elements mounted on said shaft, one thereof including radially movable segments, an inflatable tube disposed within said segments for moving the same into engagement with the other element, a ball diaphragm communicably connected with said tube and containing a fluid pressure medium, and controllable means including a plunger, a pivotally mounted member pivotally connected with said plunger and a member slidable on said shaft for actuating said last-mentioned member.

2. A fluid pressure device, comprising a shaft, a friction drum loosely mounted on said shaft, a unit secured to said shaft and disposed within said drum, said unit comprising radially movable parts, an inflatable tube for actuating said parts, a diaphragm pump communicably connected with said tube, a support secured to said shaft and formed to provide housings for the parts last above mentioned, and manually controllable means for operating said pump.

3. In a fluid pressure device, the combination of a shaft and two members concentrically mounted thereon, the one within the other, one of said members being formed with peripheral spaced flanges forming a seat, a concentric series of arcuate segments carried by one of said members and arranged in said seat, an inflatable tube disposed in said seat and adapted to shift said segments into contact with the other member, said inner member having its walls formed to provide a smooth wall hollowed-out portion and a hollow collapsible member enclosed by said walls and connected with said inflatable tube, and means for collapsing said hollow member to cause the inflation of said tube.

4. In a fluid pressure device, the combination of a shaft and two members concentrically disposed thereon, the one within the other, one of said members having spaced peripheral flanges forming a seat, a concentric series of arcuate segments disposed in said seat, an inflatable tube in said seat for shifting said segments, the inner member having its walls formed with a substantially smooth hollow cavity, a compressible hollow member housed in said cavity and formed with a connection to said inflatable tube, a portion of said casing walls having an opening therein and a plunger having a smooth curved end slidably mounted in said opening and adapted on movement to compress the hollow ball within said cavity, a member pivotally mounted on said inner member and means for shifting said pivoted member for compressing said hollow member to inflate said tube.

5. In a fluid pressure device, the combination of a shaft and two members concentrically disposed thereon, the inner member thereof having peripheral flanges forming a circumferential seat, a concentric series of arcuate segments disposed in said seat, an inflatable tube concentrically disposed within said segments, said inner member having its walls hollowed to receive and enclose a hollow compressible member, a cap having curved walls adapted to cover the opening formed in the hollowed-out walls of said inner member, said cap having a guideway therethrough, a plunger shiftably mounted in said guideway and having a substantially smooth inner surface to engage and compress the hollow compressible member housed in said hollowed-out portion of the inner member, a substantially triangular-shaped member pivoted to said inner member and having a slotted arm arranged opposite said plunger and connected thereto, said triangular-shaped arm having a cam portion adapted to be engaged by a wedge member slidable along said shaft.

6. A fluid pressure device comprising two annular members mounted to rotate relatively or to remain relatively at rest, shiftable means between said members, an inflatable device carried by one of said members and disposed between said member and the shiftable means and a collapsible actuator hermetically connected to said inflatable device and forming therewith a closed fluid containing system said collapsible actuator being carried by the same member which carries the inflatable device.

7. A fluid pressure device comprising two annular members mounted to rotate relatively or to remain relatively at rest, shiftable means between said members, and a hermetically sealed fluid containing system carried by one of said members and containing two collapsible fluid containing devices hermetically connected, one of which devices is located between one of said members and the shiftable means.

8. A fluid pressure device comprising two annular members mounted to rotate relatively or to remain relatively at rest, shiftable segments carried by one of said members, an inflatable member positioned adjacent said segments to actuate them, a collapsible actuator, a conduit connecting said inflatable member and actuator and forming with them a hermetically sealed fluid containing system and means for actuating said collapsible actuator.

9. A fluid pressure device, comprising two members concentrically mounted and adapted to rotate relatively or to remain relatively at rest, means forming spaced apart circumferential flanges providing a peripheral seat, and a concentric series of radially shiftable segments mounted in said seat adapted to be shifted into engagement with one of said members, an inflatable tube housed in said seat and adapted to shift said segmental members, a hollow compressible member of flexible material mounted directly on one of said members, said member on which said flexible member is mounted being constructed and arranged to form a rigid housing for the peripheral walls of said hollow member, a portion of said rigid housing walls being movable relatively to the remaining portions thereof, to cause the compression of said hollow member, and means for shifting such movable portion of said housing.

10. A fluid pressure device comprising two members concentrically mounted and adapted to rotate relatively or to remain relatively at rest, shiftable means between said members, an inflatable device carried by one of said members and disposed between said member and the shiftable means and a collapsible actuator hermetically connected to said inflatable device and forming therewith a closed fluid containing system, said collapsible actuator being carried by the same member which carries the inflatable device.

11. A fluid pressure device comprising two concentrically disposed members mounted to rotate relatively or to remain relatively at rest, shiftable means mounted between said members, and a hermetically sealed fluid containing system carried by one of said members and containing two collapsible fluid containing devices hermeticaly connected, one of which devices is located between one of said members and the shiftable means.

12. A fluid pressure device comprising two concentrically disposed members mounted to rotate relatively or to remain relatively at rest, shiftable means mounted between said members, and a hermetically sealed fluid containing system carried by the inner one of said members and containing two collapsible fluid containing devices hermetically connected, one of which devices is located between the inner member and the shiftable means.

13. A fluid pressure device comprising two concentrically disposed members mounted to rotate relatively or to remain relatively at rest, radially shiftable segments carried by one of said members, an inflatable member positioned adjacent said segments to actuate them, a collapsible actuator, a conduit connecting said inflatable member and actuator and forming with them a hermetically sealed fluid containing system and means for actuating said collapsible actuator.

BERT A. LINDERMAN.